United States Patent
Remmel et al.

(10) Patent No.: US 8,360,512 B2
(45) Date of Patent: Jan. 29, 2013

(54) STANCHION

(75) Inventors: Roger Remmel, Remscheid (DE); Karl Kemmerling, Solingen (DE); Lars Remmel, Remscheid (DE)

(73) Assignee: Edscha LKW-Schiebeverdecke GmbH, Remscheid (DE)

( * ) Notice: Subject to any disclaimer, the term of this patent is extended or adjusted under 35 U.S.C. 154(b) by 625 days.

(21) Appl. No.: 10/518,187

(22) PCT Filed: Jun. 20, 2003

(86) PCT No.: PCT/DE03/02054
§ 371 (c)(1),
(2), (4) Date: Dec. 16, 2004

(87) PCT Pub. No.: WO2004/002803
PCT Pub. Date: Jan. 8, 2004

(65) Prior Publication Data
US 2005/0231004 A1    Oct. 20, 2005

(30) Foreign Application Priority Data
Jun. 28, 2002 (DE) ................. 102 28 982

(51) Int. Cl.
*B60J 5/06* (2006.01)

(52) U.S. Cl. ............. 296/186.2; 296/181.7; 296/100.16; 296/36; 52/697; 248/455

(58) Field of Classification Search ............... 52/697; 296/98, 181, 100.16, 181.7, 36, 186.2, 138, 296/155; 248/455, 461
See application file for complete search history.

(56) References Cited

U.S. PATENT DOCUMENTS

| | | | | |
|---|---|---|---|---|
| 3,627,375 A | * | 12/1971 | Rosen | 296/36 |
| 3,873,221 A | * | 3/1975 | Greenfield | 403/189 |
| 4,421,943 A | * | 12/1983 | Withjack | 136/246 |
| 4,452,234 A | * | 6/1984 | Withjack | 126/627 |
| 4,952,009 A | * | 8/1990 | Mountz et al. | 296/186.2 |
| 5,658,037 A | * | 8/1997 | Evans et al. | 296/98 |
| 6,474,720 B1 | * | 11/2002 | Fliege et al. | 296/100.16 |
| 6,561,564 B1 | * | 5/2003 | Fliege et al. | 296/100.12 |

FOREIGN PATENT DOCUMENTS

| | | | |
|---|---|---|---|
| DE | 19913616 | * | 3/1999 |
| DE | 20000002 | | 4/2000 |
| DE | 202 05 984 | | 9/2002 |
| DE | 20301201 | | 4/2003 |
| EP | 0831001 | * | 9/1997 |
| EP | 1112917 | * | 12/2000 |
| EP | 1787842 | * | 11/2006 |
| FR | 2802867 | * | 12/1999 |
| FR | 2802867 | | 6/2001 |
| WO | 0204277 | | 1/2002 |

* cited by examiner

Primary Examiner — William Gilbert
Assistant Examiner — Chi Q Nguyen
(74) Attorney, Agent, or Firm — Davidson, Davidson & Kappel, LLC (57) ABSTRACT

A stanchion for a tarpaulin structure, which can be locked onto a fixing member. The stanchion can be reliably locked and has an improved service life, achieved by the provision of a counter bearing and a support element, the latter being inserted between the fixing member and the counter bearing.

25 Claims, 10 Drawing Sheets

STANCHION

The invention relates to a stanchion for a tarpaulin structure, which stanchion can be locked on a fixing member.

BACKGROUND

Stanchions are provided in practice for supporting horizontal supports of tarpaulin structures, such as, for example, sliding tarpaulins. A tarpaulin structure of this type can be designed for bodies of truck platforms or of semitrailers, but also for containers or railroad freight cars. In the case of sliding tarpaulins, in order to be able to rapidly load or unload them, the side tarpaulins hanging down from the supports can be pushed together, and also the roof tarpaulin, which runs between the longitudinal supports, can be pushed together by means of movable bows, on which the roof tarpaulin is secured. In order to further improve the access to the loading space, the tarpaulin frames of the sliding tarpaulins are designed such that they can easily be removed. The intention is, in particular, for the central stanchions to be able to be rapidly removed, but frequently also the corner stanchions, which are also referred to as posts, the supports also having to be removed in this second case while said supports, if only the central stanchions are released, are adequately supported by the posts if the sliding tarpaulin is not moved. Other tarpaulin structures support a chassis roof which is formed, for example, with little weight from a plastic sheeting riveted on the longitudinal supports, so that the displacement only of the side tarpaulins is envisaged.

In practice, a series of stanchion arrangements is known where one stanchion in each case can be locked on a corresponding fixing member, which is also referred to as a stanchion shoe, by means of a rapidly releasable fastening, the stanchion shoe as a rule being secured, for example by screwing or by welding, on a supporting outer part of the loading area of the sliding tarpaulin, for example on a metal frame which supports wooden battens.

A first embodiment, which is known in practice, of a lockable central stanchion has a lever arrangement with an intermediate lever and a main lever, the intermediate lever being coupled to the stanchion by a first joint and being coupled to the main lever via a second joint, and the main lever having an actuating handle on the long lever arm and a design in the form of a pressing member on the short lever arm. In order to lock the stanchion, the pressing member is fitted behind an upwardly protruding lug of the stanchion shoe and, by actuation of the main lever, the stanchion is pushed away upward by the stanchion shoe via the two levers until the lever arrangement is locked. In this embodiment, the entire load of the stanchion and of the longitudinal support and all of the forces also acting on the stanchion during the journey are transmitted to the stanchion shoe via the two joints, as a result of which the joints are subjected to an extreme amount of stress and the stanchion only has a limited service life. In addition, this embodiment does not have any means of fixing the stanchion in the direction of the longitudinal supports.

A second embodiment, which is known in practice, of a lockable central stanchion has a first lever which is in the manner of an upward clip and is inserted into a U-profile of a stanchion bearing, and a second lever which is coupled to the body of the stanchion and which is coupled via an intermediate lever to a locking wedge which can be shifted axially in the body of the stanchion, the stanchion bearing having a pocket for receiving the locking wedge. First of all, the stanchion, which is at an angle to the first lever, is pivoted in the direction of the stanchion bearing and in the process raised, the vertical forces being conducted via the first lever and its coupling means into the stanchion. Then, by actuation of the second lever, the locking wedge is lowered into the pocket of the stanchion bearing and the stanchion tilting unstably about the joint with the first lever is thereby locked. Only if the first lever and its dynamically greatly stressed joint on the stanchion fail can the locking wedge conduct vertical loads on the stanchion into the intercepting pocket, but this takes place only via the second lever and its coupling means, which is not designed for this purpose. Furthermore, the shiftable locking wedge itself constitutes a further part which is susceptible to wear. The known stanchion arrangement is, however, difficult to handle, since it has to be shifted manually into the raised position.

A third embodiment, which is known in practice, of a lockable central stanchion has a lever which is coupled to the body of the stanchion and one lever arm of which has a handle and the other lever arm of which can be introduced into a U-shaped stanchion bearing, the stanchion being raised by pressing the lever with the handle on to the body of the stanchion. Here too, the vertical forces from the stanchion bearing are conducted into the stanchion via the lever.

It is object of the invention to provide a stanchion for a tarpaulin structure, which can be reliably locked and has an improved service life.

SUMMARY OF THE INVENTION

The present invention provides a stachion for a tarpaulin structure that can be locked on a fixing member and that has a counterbearing and a supporting element which can be inserted between the fixing member and the counterbearing.

The stanchion according to the invention therefore provides a reliable flow of force from the fixing member to the body of the stanchion. The vertical forces are transmitted reliably in particular if the counterbearing is arranged fixedly on the body of the stanchion. The service life of a stanchion of this type is significantly improved because susceptible articulated parts are not subjected to stress after locking and, in particular, during the ride.

The transmission of the vertical forces from the fixing member to the stanchion is particularly advantageous if the plane of contact between the fixing member and supporting element and also the plane of contact between the supporting element and counterbearing is formed horizontally and therefore perpendicularly to the main direction of action of the transmitted forces, or has at least horizontal sections. At the same time, this preferred type of form-fitting arrangement permits simple manufacturing and a design of the component thicknesses that is simple to calculate. As an alternative, however, provision may also be made for the boundaries of the supporting element, in each case matched to the contour of the two adjacent parts, to be situated in a plurality of planes, for example in a manner having a plurality of gradations, in order to facilitate the insertion, or else to have a plane inclined with respect to the horizontal, for example if the supporting element has a wedge shape. In particular, the lower boundary of the supporting element can be matched in its configuration to known stanchion shoes, so that stanchions from the prior art which have become unusable can be replaced at any time by a stanchion according to the invention without altering the fixing member or existing stanchions can be designed in accordance with the invention by retrofitting a supporting element and/or a counterbearing.

In principle, the supporting element may be a part which can be detached from the stanchion or fixing member, is stored separately when the stanchion is unlocked and, when the stanchion is locked, is inserted between the fixing member and the counterbearing, which is connected fixedly to the stanchion. In this case, the supporting element is preferably designed with its own handle for pulling it out and can furthermore have a collar section, with which it defines an end stop in the insertion direction and, if required, has a boundary for a lever arranged pivotably on the stanchion. Furthermore, the detachable supporting element may also have a hole which is provided for receiving a securing pin which, for example, passes horizontally through the stanchion, in which case then, with the stanchion unlocked, the releasable supporting element could be secured again by this securing pin. A releasable supporting element of this type would expediently be dimensioned in such a manner that it also secures the stanchion on the fixing member in the transverse direction; one possible configuration can be selected in a form in which it frames the fixing member and is framed by the foot region of the stanchion.

Similarly, the supporting element may be arranged, for example pivotably, on the fixing member or on a part connected fixedly to the fixing member, for example the loading area on which the fixing member is secured, with the result that, when the stanchion is unlocked, the supporting element is not lost.

However, the provision of the supporting element on a part of the stanchion is particularly preferred, the part or the supporting element expediently being mounted pivotably on the stanchion, so that the supporting element is not lost even when the stanchion is unlocked.

It is possible, in particular, for the supporting element to be of multipart design and, in this connection, for it to combine different arrangements, for example a releasable, first supporting element and a second supporting element provided on the stanchion, which supporting elements together transmit the vertical forces from the stanchion into the fixing member.

The stanchion according to the invention preferably comprises a lever arrangement, for example a toggle lever arrangement, which mounts at least one lever in the stanchion, with which the stanchion can be raised, with the result that raising manually is not required. A lever arrangement of this type may comprise both a lever coupled directly to the body of the stanchion and also a plurality of levers. One end of one of the levers for raising the stanchion can expediently be supported against the fixing member and will have a corresponding end, for example designed as a pressing member. Since the joints and bearings of the levers in the stanchion according to the invention are subjected to significantly less stress, if any at all, in its locked state, the joints of the stanchion no longer constitute the critical component of the stanchion. Provision is preferably made for the lever arrangement to be engaged with the fixing member only for the raising and slow lowering of the and for it afterward to be able to be disconnected in each case.

One particularly advantageous development of the stanchion according to the invention, which is provided with a lever arrangement, resides in the arrangement of the supporting element on one of the levers of the lever arrangement. The actuation of the lever arrangement is thus advantageously combined, for locking purposes, with the insertion of the supporting element and, for unlocking purposes, with the removal of the supporting element without additional operations being required for this. As soon as the supporting element has been pulled out—which generally only occurs when the vehicle is stationary—the lever arrangement takes over the load of the stanchion until the latter is lowered. Conversely, the lever arrangement is relieved of load at the same time as locking takes place. In this case, the supporting element can be inserted both from the outer side and from the inner side of the stanchion.

The stanchion preferably has in its foot region below a cutout in its body, which cutout is provided for the fixing member to pass through, a transverse web which, when the stanchion is locked, is raised behind a downwardly protruding lug of the fixing member and therefore defines a securing means in the direction away from the loading area while the frame of the loading area defines a stop for the foot region of the stanchion. Furthermore, struts rising from the transverse web are preferably provided, said struts, in the locked state of the stanchion, being raised to such an extent that they reach behind a laterally overhanging part of the fixing member and therefore complement the securing by the transverse web. The distance between the struts is advantageously dimensioned in such a manner that they frame the fixing member without or with a small amount of play and therefore also prevent a knocking of the stanchion in its transverse direction parallel to the transverse web. In this case, the struts are advantageously dimensioned in such a manner that they protrude somewhat upward over the laterally overhanging part of the fixing member when the stanchion is locked. Provision is preferably made for the struts to then furthermore support the supporting element laterally if the latter is of such thick design that it reaches between the struts arranged in a rear region in the stanchion. As an alternative, provision may be made for the supporting element not to reach into the region of the struts, but rather to rest only on a front section of the fixing member.

The cutout in the foot region of the stanchion is preferably bounded by the counterbearing, so that the supporting element can be designed to be small and therefore with little weight.

The stanchion according to the invention can advantageously transmit vertical forces particularly readily because of its design with a double C profile, which is not interrupted over the length of the stanchion and, preferably in the foot region, has reinforcements in the region of the central cutout. The closed, uninterrupted frame in the lower stanchion part therefore enables the stanchion to be subjected to a high load. Furthermore, the stanchion defines, at least in the central section between the two C-shaped projections, a rear wall which faces the load and in which, in a simple manner and with little outlay by means of perforations or the like, receptacles for, for example, a second horizontal floor for multistory loading with goods which can be difficult to stack, or fixing means for partitions between the freight or securing means for the freight or straps. The good transmission of the forces of the stanchion according to the invention makes this possible without the stanchion prematurely failing and without separate supporting means having to be provided for this.

A stanchion arrangement according to the invention and a tarpaulin structure according to the invention are distinguished by a stanchion according to the invention.

Further advantages and features of the invention emerge from the following description and from the claims.

BRIEF DESCRIPTION OF THE DRAWINGS

The invention is explained in greater detail below using a preferred exemplary embodiment of a stanchion according to the invention with reference to the attached drawings.

DETAILED DESCRIPTION

Figure 1:
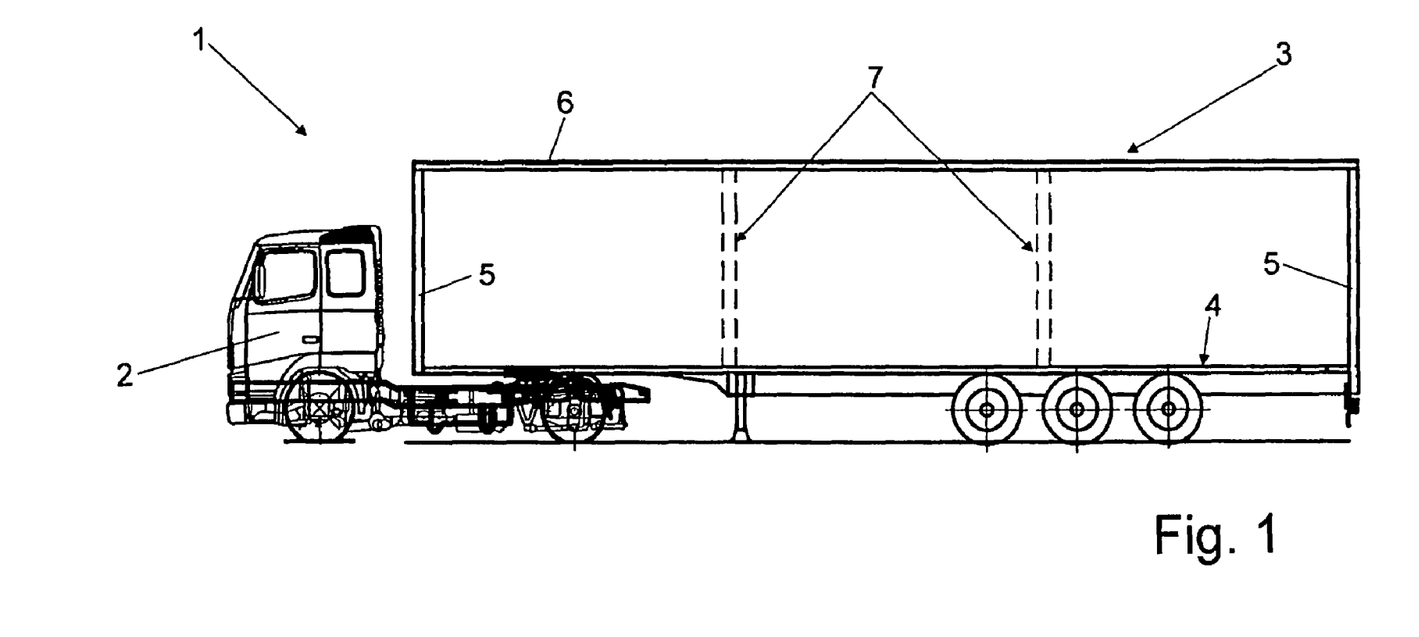
FIG. 1 shows a schematic side view of a sliding tarpaulin which is designed as a semitrailer and has stanchions according to the invention drawn in dashed lines.

The truck with trailer 1 which is illustrated schematically in FIG. 1 comprises a tractor 2 and a semitrailer 3. The semitrailer 3 is designed as a sliding tarpaulin, in which a loading area 4 has vertical posts 5 which are arranged in the corners and support horizontal longitudinal supports 6 running in the direction of travel and cross supports (which cannot be seen in the side view), two stanchions 7 being arranged between the two posts 5, said stanchions connecting the loading area 4 to the longitudinal supports 6 and supporting the latter vertically. Side tarpaulins hang down laterally from the longitudinal supports 6, and a roof tarpaulin is arranged displaceably between the two longitudinal supports 6. In order to improve the load-bearing capacity of the loading platform, in the case of frames of sliding tarpaulins, as is illustrated in FIG. 1, at least the stanchion 7 is generally designed in such a manner that it can be released from its anchoring and sometimes the longitudinal supports 6 and the posts 5 can also be released.

Figure 2:
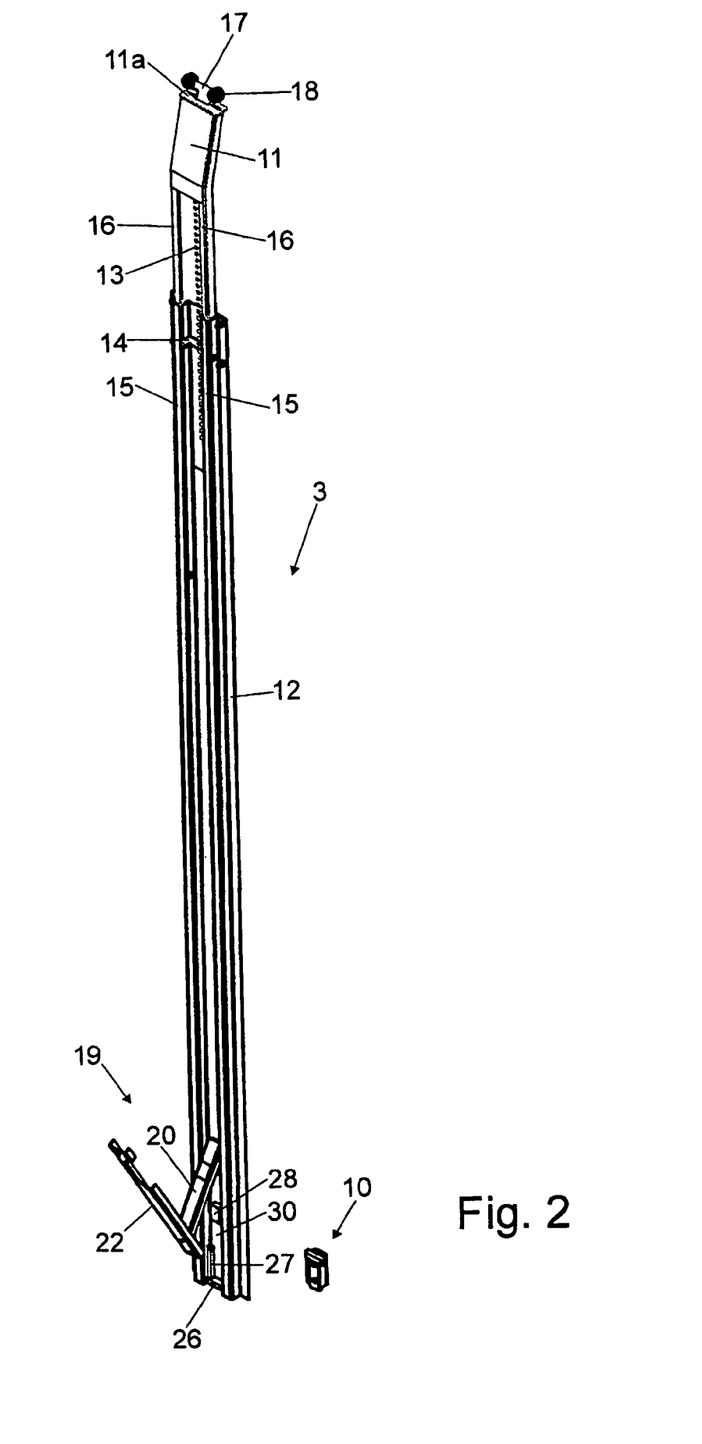
FIG. 2 shows a perspective view of a stanchion according to the invention before securing it on the loading platform.

In particular for the stanchions 7, a rapid clamping and locking or release is desired. FIG. 2 illustrates the perspective view of a preferred exemplary embodiment of a stanchion arrangement having a stanchion 7 according to the invention and a fixing member 10, designed in the present case as a stanchion shoe, which is secured, for example firmly screwed, on the outside of the loading area 4 of the sliding tarpaulin 3.

The fixing member 10 comprises a metal part 10a, which is bent in a U-shaped manner, and a T-shaped metal part 10b, holes 10c which are aligned with each other being formed in that section of the T-shaped metal part 10b which runs vertically and in the base of the U-shaped metal part 10a, through which holes fixing bolts can be guided in order to secure the fixing member 10 in the region of the loading area 4. That section of the T-shaped metal part 10b which is provided with the holes 10c is at a distance from the base of the U-shaped metal part 10a, but fills the distance between the two limbs of the U-shaped metal part 10a and prevents them from becoming distorted when subjected to a load. The horizontally extending head 10e of the T-shaped metal part 10b is designed as square solid material and is inserted into recesses of the corners of the limbs of the U-shaped metal part 10a and protrudes on both sides over the limbs of the U-shaped metal part 10a. The two metal parts 10a, 10b end upward in a flush manner and define a horizontal bearing surface while the vertical section of the T-shaped metal part 10b protrudes downward over the U-shaped metal part 10a and defines a lug 10d. The metal parts 10a and 10b together form a stable and torsionally resistant fixing member 10 which can readily transmit forces in all directions. In particular, the vertical forces acting on the head 10e are conducted away via the metal parts 10a, 10b into the frame (not illustrated) of the loading area 4 of the sliding tarpaulin 3.

The stanchion 7 comprises an upper stanchion part 11 and a lower stanchion part 12 which are shaped in such a manner that they can be displaced relative to each other and the stanchions 7 can therefore be varied in height during the manufacturing process. The upper stanchion part 11 has a perforation 13 in which a locking bolt 14 of the lower stanchion part 12 engages and therefore defines the height of the stanchion 7. The perforation 13 and the locking bolt 14 make it possible to produce stanchions 7 of different heights from a standardized, upper stanchion part 11 and lower stanchion part 12 without other parts being required in each case for this.

In the region of its connection to the upper stanchion part 11, the lower stanchion part 12 has a flat form which has two rectangular projections 15 in which corresponding elevated portions 16 of the upper stanchion part 11 engage in each case. This ensures a good transmission of forces and moments by the lower stanchion part 12 to the upper stanchion part 11. In the region of the connection of the two stanchion parts 11, 12, the rear side of the projections 15 is closed by a covering plate 12a which is firmly screwed to the lower stanchion part 12.

Figure 6:
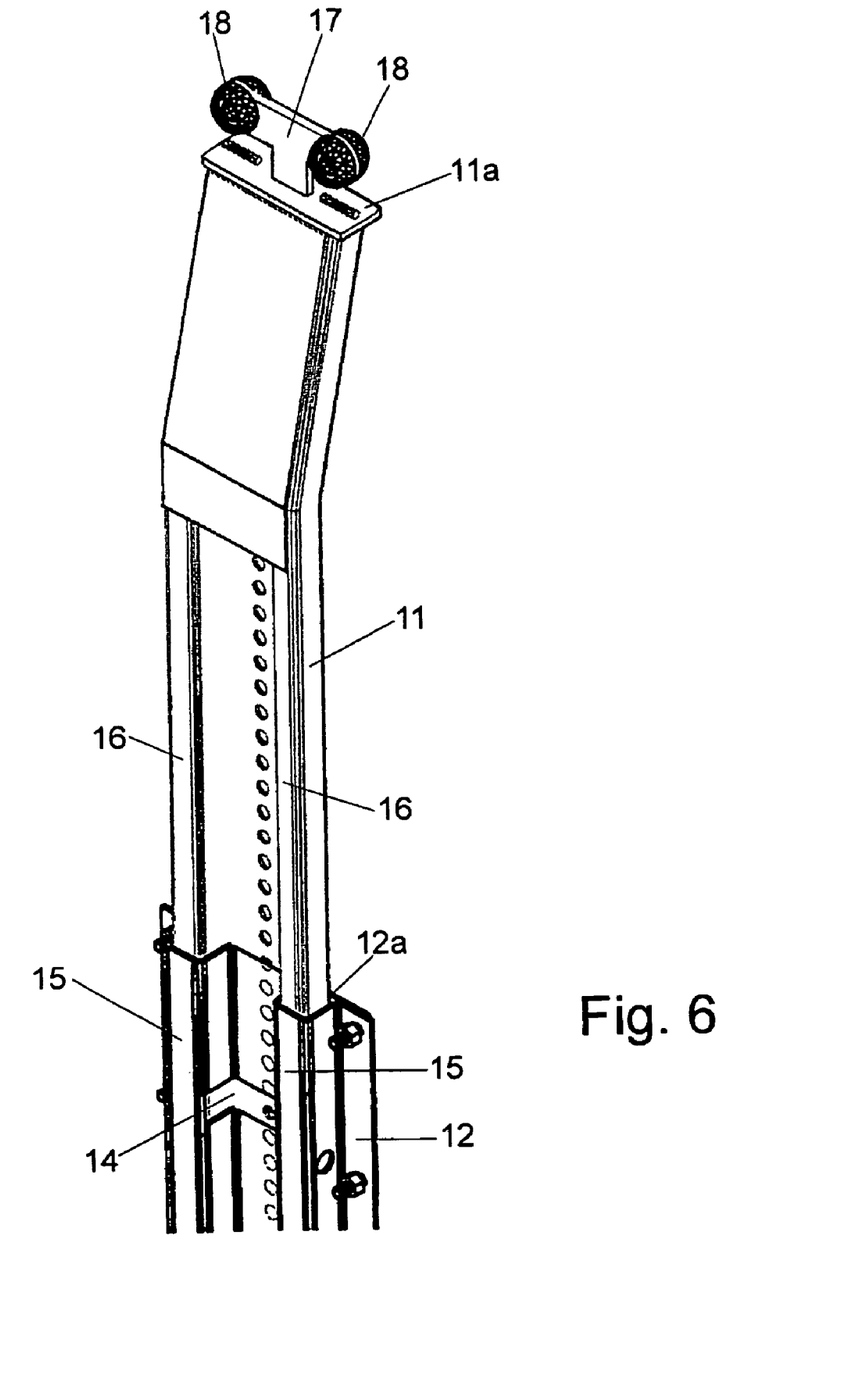
FIG. 6 shows the upper region of the stanchion from FIG. 2.

As can be seen in greater detail in FIG. 6, the upper stanchion part 11 has in its upper section a T-shaped extension 17 in the ends of which are mounted two double rollers 18 which engage in a track of the longitudinal support 6. When the stanchion 7 is unlocked, rolling of the rollers 18 therefore enables them to be displaced along the longitudinal support 6. A supporting region 11a of the upper stanchion part 11 is designed as a flat horizontal support and is intended, after the stanchion 7 is raised, to come to bear against a lower flat side of the associated longitudinal support 6, as a result of which, when the stanchion 7 is locked, the rollers 18 are relieved of load and, furthermore, a possibly present sagging of the longitudinal support 6 is opposed.

In order to achieve an effective vertical support of the longitudinal support 6, it is necessary for the stanchion 7, with its lower region on the fixing member 10, to be raised and locked in such a manner that the forces are conducted advantageously vertically into the stanchion 7 and also lateral or vertical play is avoided. For this purpose, the stanchion 3, as can be seen more precisely in FIG. 3, has a toggle lever arrangement 19, with an intermediate lever 20 and a main lever 22. At one end, the intermediate lever 20 is mounted on the lower stanchion part between the two rectangular projections 15 in a joint 21 in the region of a fixing unit 21a and at the other end is mounted on the main lever 22 via a joint 23, the short lever arm 22a of the main lever 22 having a claw part 24 on the end side, and the long lever 22b of the main lever 22 having a handle recess 25 at its end facing away from the joint 23. The claw part 24 is secured on a solid supporting element 29.

Figure 3:
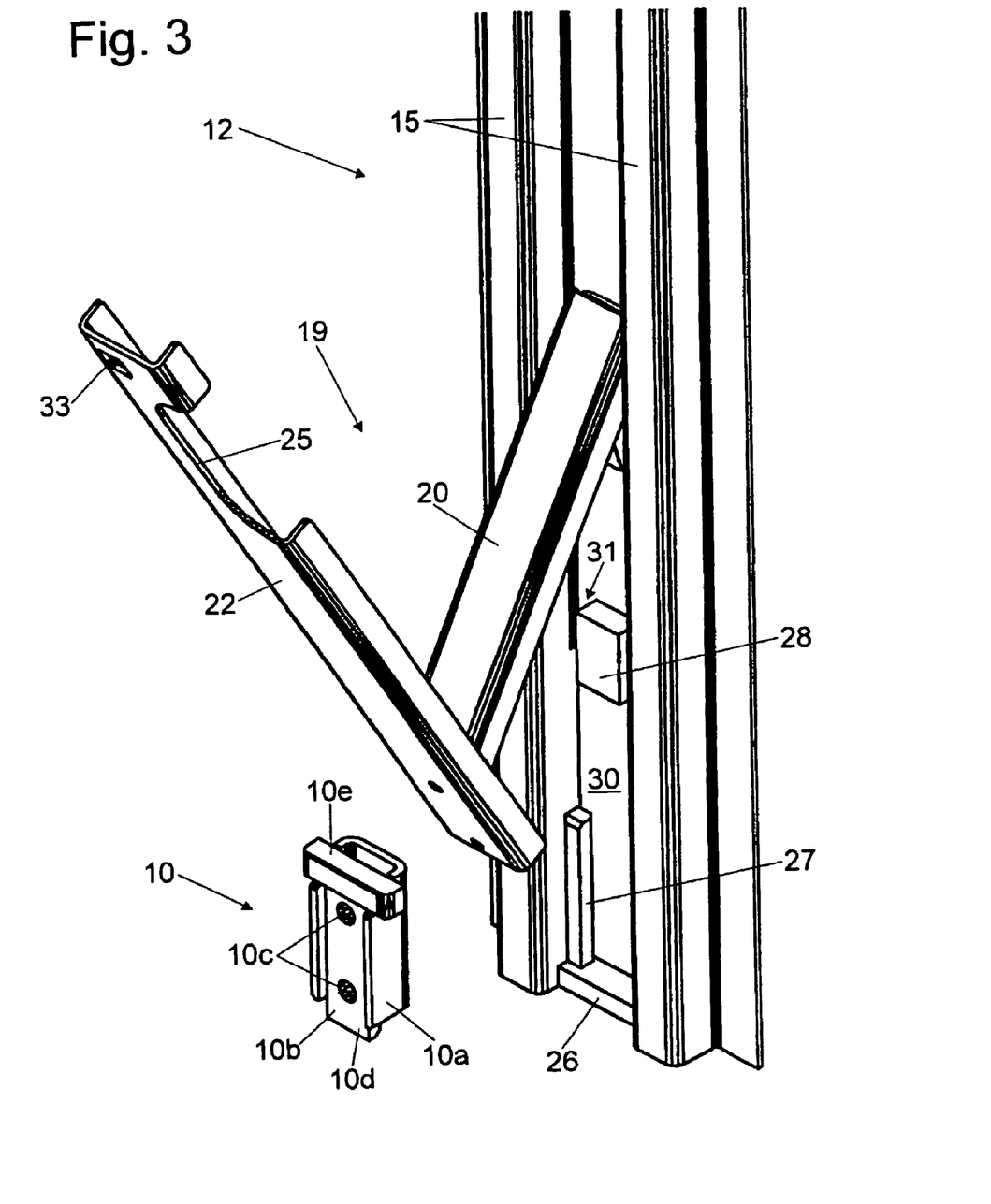
FIG. 3 shows the lower region of the stanchion from FIG. 2 before securing it on the loading platform, and the fixing member arranged on the loading platform.

In its lower region, the stanchion 3 has, on its lower stanchion part 12, a transverse web 26 which connects the region between the two projections 15 to each other and at the same time is set back relative to the end sides of the projections 15. At the same time, the transverse web 26 downwardly bounds a cutout 30 in the foot region of the lower stanchion part 12. The cutout is dimensioned in such a manner that the stanchion 7 can be pushed there over the fixing member 10. Furthermore, struts 27 protruding on both sides of the transverse web 26 are arranged vertically and in the region of the projections 15 and are set back a further distance relative to the web 26.

Above the cutout 30 there is a counterbearing 28 in the form of a metal block which is welded to the lower stanchion part 12 centrally between the two projections 15 or is fixed in another suitable manner. The counterbearing 28 is approximately as wide as the supporting element 29 or the fixing member 10. A gap 31 is provided in each case between the counterbearing 28 and the projections 15. The distance between the transverse web 26 and counterbearing 28 corresponds approximately to the common height of the supporting element 29 and fixing member 10.

The supporting element 29 is connected fixedly to the main lever 22 by welding or preferably by screwing. At the same time, the bearing of the joint 23 is also provided in the supporting element 28. As an alternative, the coupling with the joint 23 could also be provided on a further part of the main lever 22 that is arranged outside the supporting element 29, for example in a region (with the stanchion 7 locked) above the counterbearing 28. The supporting element 29 has boundary surfaces which face the upper side of the fixing member 10 and the lower side of the counterbearing 28 and are matched in their shape to them, i.e. in the present case flat boundary surfaces. It is possible to round off the corners of the supporting element 29 which face the lower stanchion part 12. To fix the claw part 24, the supporting element 29 is designed to be somewhat less thick than the provided depth of the cutout 30.

Figures 7, 9:
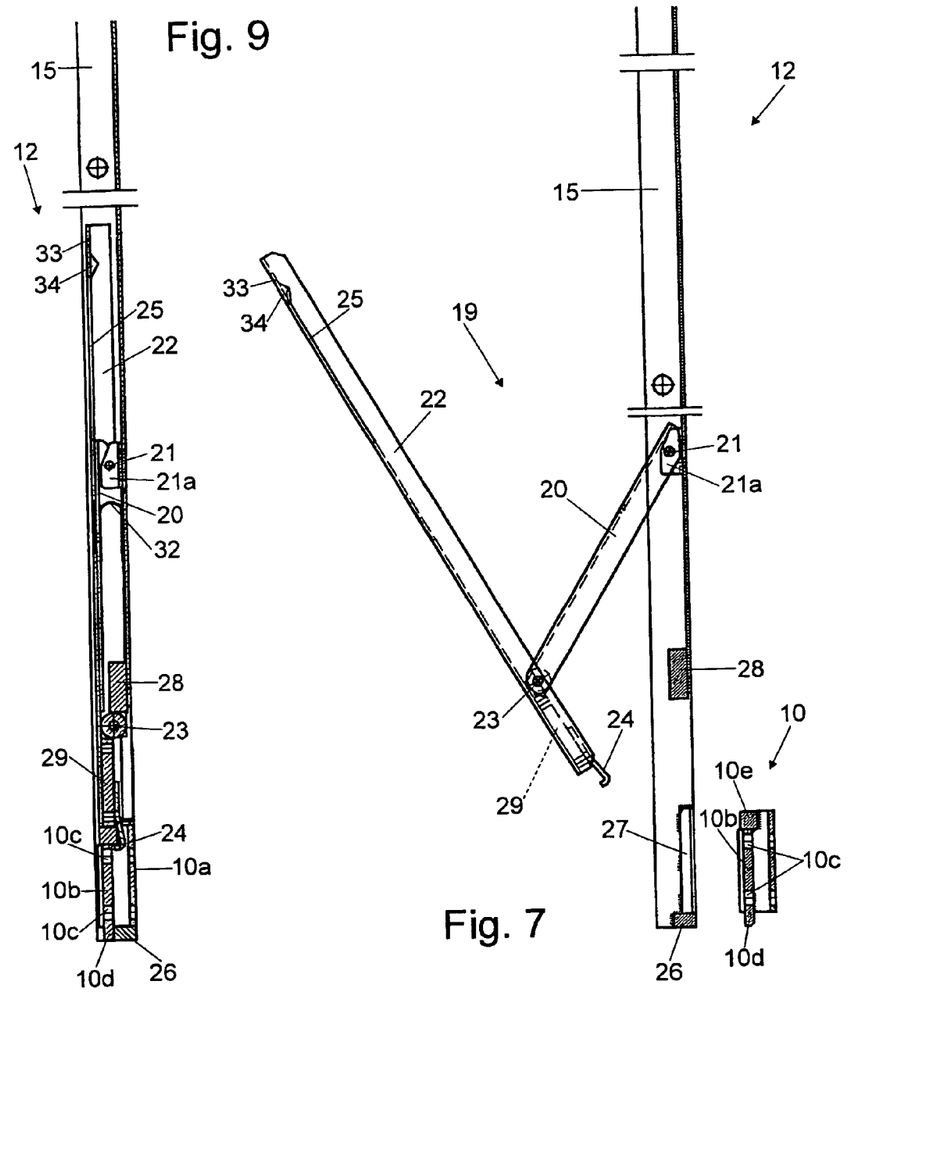
FIG. 7 shows a partially sectioned side view of the lower region of the stanchion according to FIG. 3.
FIG. 9 shows a partially sectioned side view of the lower region of the stanchion according to FIG. 5.

Starting from an open position of the stanchion 7, as illustrated in FIG. 3 and FIG. 7, the claw part 24 is intended to reach behind the head 10e of the T-shaped metal part 10b and, by means of its bent portion on the end side, to initially interlock the main lever 22 in the fixing member 10.

Figure 4:
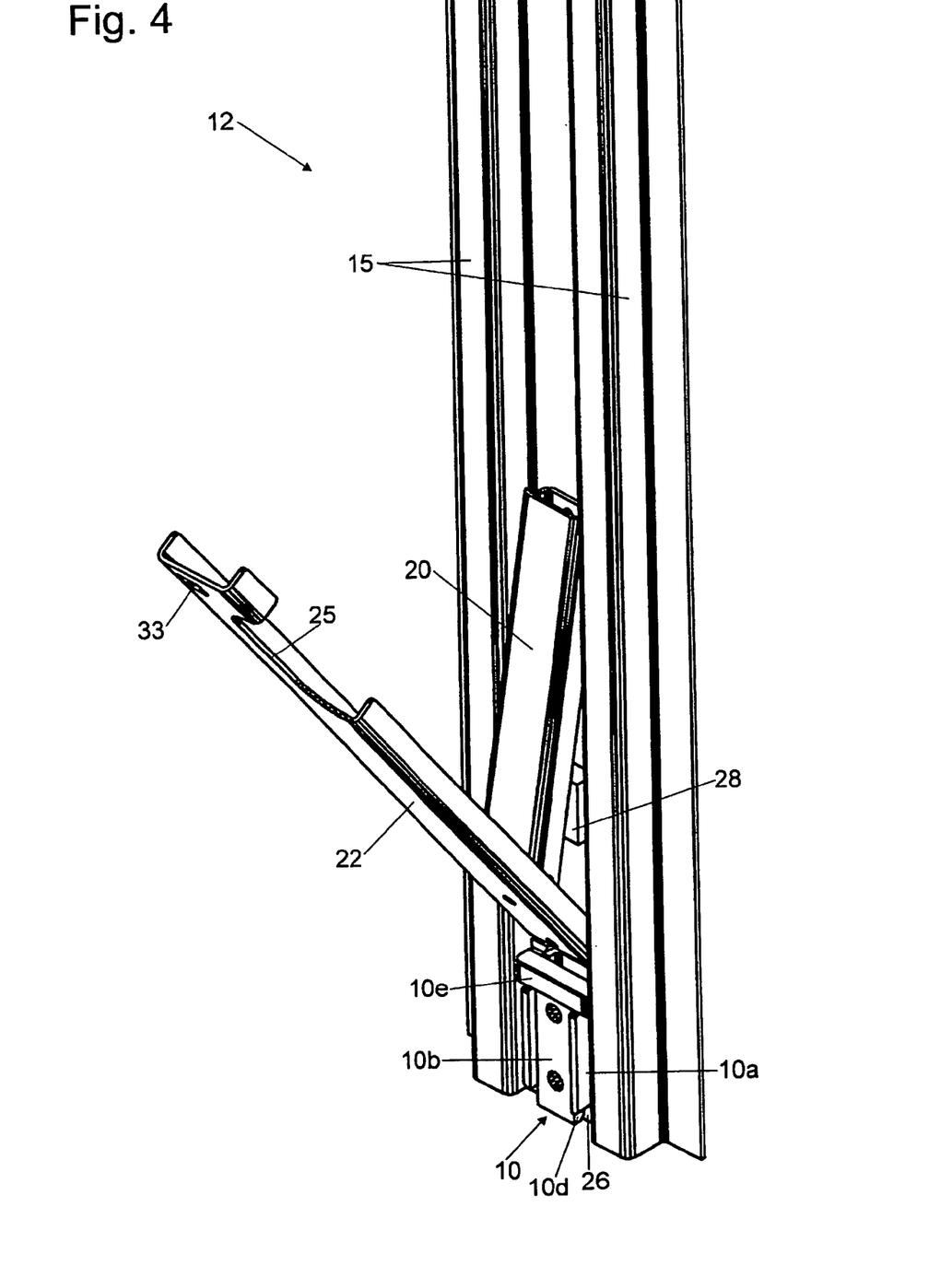
FIG. 4 shows the lower region of the stanchion from FIG. 2 during the locking on the loading platform.
Figure 8:
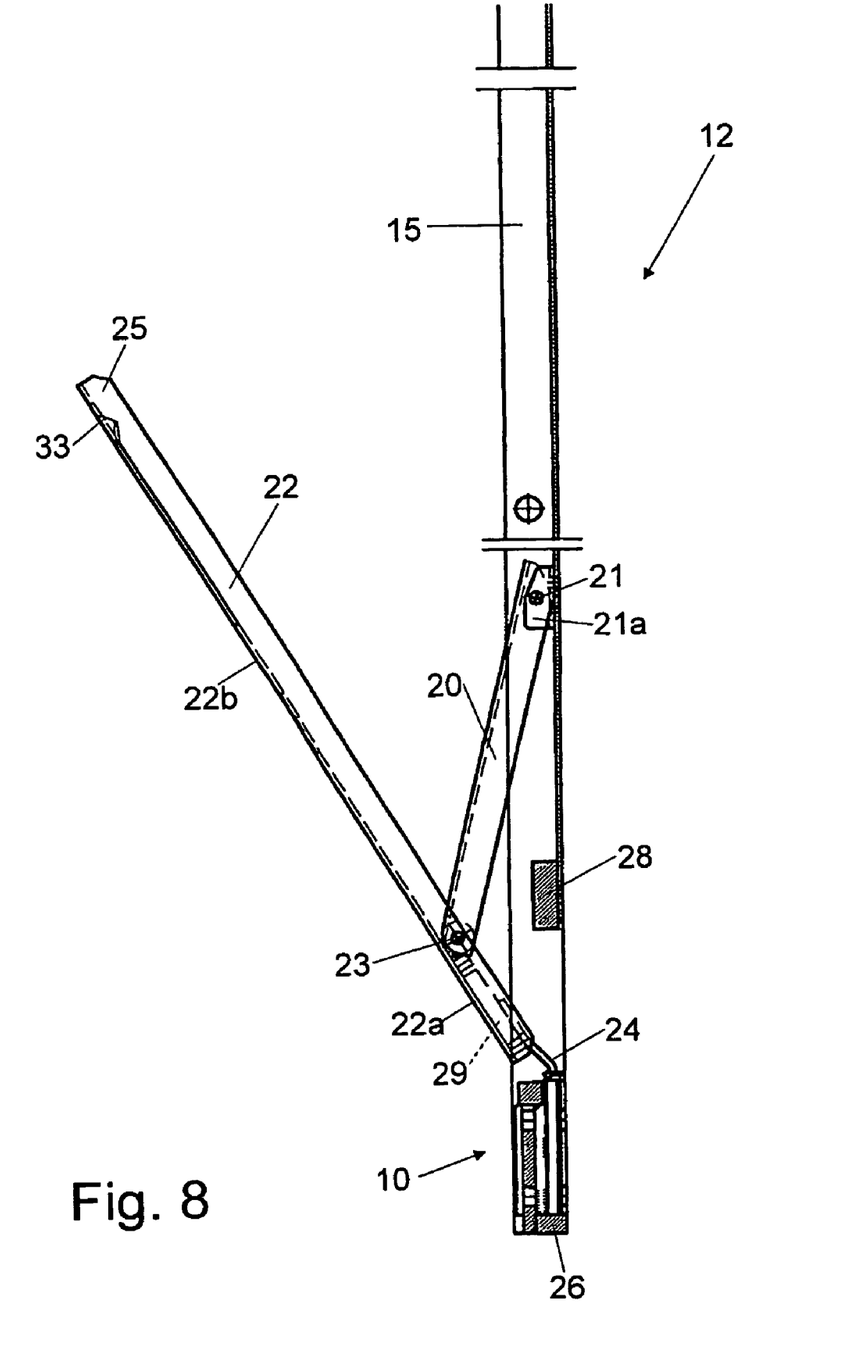
FIG. 8 shows a partially sectioned side view of the lower region of the stanchion according to FIG. 4.
Figure 10:
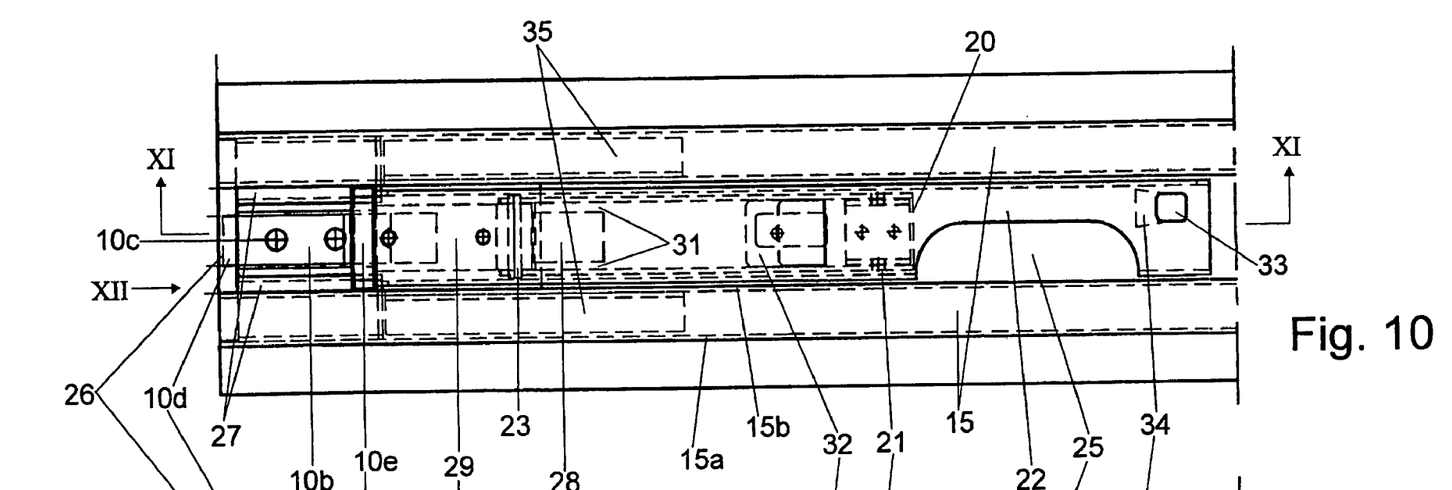
FIG. 10 shows a plan view of the lower region of the stanchion from FIG. 2 in the locked state.
Figure 11:
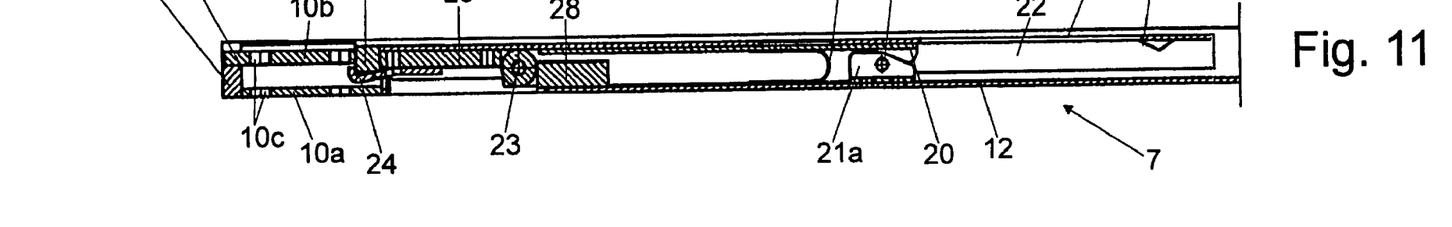
FIG. 11 shows a longitudinal section through the lower region of the stanchion from FIG. 2 in the locked state.

In order to fit the stanchion 7, the carriage 17, if this has not yet taken place, is fitted into the longitudinal support 6 and the cutout 30 of the stanchion 7 is guided over the fixing member 10 in such a manner that the transverse web 26 is situated behind and under the downwardly protruding lug 10d of the T-shaped metal part 10b and the struts 27 laterally frame the U-shaped metal part 10a. To this end, the toggle lever arrangement 19, if appropriate, is raised or pivoted upward. This may take place manually; in the present exemplary embodiment, a leaf spring 32 which is secured on the intermediate lever 22 and on the lower stanchion part 12 and spreads them apart is provided for this. The claw part 24 is introduced into the upper slot of the fixing member 10, which is surrounded by the parts 10a, 10b, as illustrated in FIG. 4 and FIG. 8. Owing to the toggle lever arrangement 19, the stanchion 7 is then raised by pressing the main lever 22, for example in the region of the handle unit 25, in the direction of the body of the lower stanchion part 12. The forces for raising the stanchion 7 are transmitted during the actuation of the lever arrangement 19 via the two joints 21, 23 by the fixing member 10 to the stanchion 7 and via the stanchion 7 to the longitudinal support 6.

Figure 5:
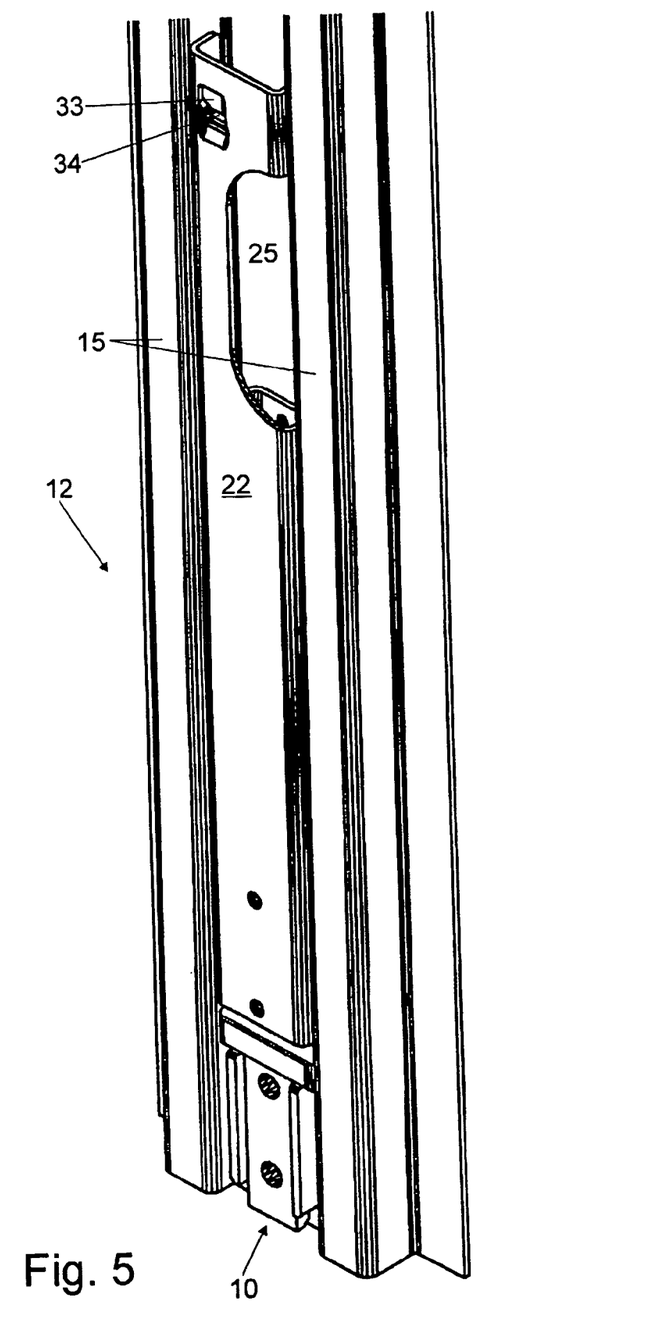
FIG. 5 shows the lower region of the stanchion from FIG. 2 in the locked state.

Pressing the main lever 22 forward brings the main lever 22 and the intermediate lever 20 to bear between the two projections 15 of the lower stanchion part 12. The levers 20, 22, which are U-shaped in their cross section, are, in this locked position illustrated graphically in FIGS. 5 and 9, folded in a manner one engaging over the other and with their base essentially parallel to the extent of the stanchion 7 while the narrow, edge-side limbs of the levers 20, 22 are situated adjacent to each other between the two projections 15 and, in the region of the counterbearing 28, penetrate the gap 31. In this case, the outside of the main lever 22 and the projections 15 are essentially aligned, as a result of which an esthetic smooth surface is defined, cf. FIGS. 5 and 9.

With the pivoting-in of the lever arrangement 19 and the raising of the stanchion 7 (and, if appropriate, of the longitudinal support 6 via the supporting region 11a), the supporting element 29 is also pressed between the fixing member 10 and the counterbearing 28. As soon as the supporting element 29 is in contact with the fixing member 10 and the counterbearing 28, the forces from the fixing member 10 are no longer transmitted essentially via the levers 20, 22 and the associated joints 23, 21, but rather via the supporting element 29. In the locked state of the stanchion 7, the joints 21, 23 are therefore virtually free from loads, with the result that, with the toggle lever arrangement 19 closed, the vertical forces are conducted via the head 10e of the T-shaped part 10b and the supporting element 29 into the counterbearing 28 and therefore into the stanchion 7. The lever arrangement 19 therefore serves primarily for raising and lowering the stanchion 7 while the vertical fixing of the stanchion 7 takes place by means of the supporting element 29.

It can be seen that the supporting element 29 is of integral design and has a somewhat narrower lower section and a somewhat wider upper section, the upper section at the same time having a bearing for the joint 23. It is possible also to provide the joint 23 at another point and to design the supporting element 29 as a part of uniform thickness. It is likewise possible to design the two sections as adjacent parts of a multipart supporting element, as a result of which the manufacturing of large piece numbers is more economical even if the tolerances of the supporting element are thereby increased. The relatively large width of the upper section of the supporting element results in a good overlap with the counterbearing 28, said overlap being advantageous for the reliable support of the stanchion 7.

At the same time, the raised stanchion 7 means that the transverse web 26 is arranged behind the lug 10d of the fixing member 10, so that a form-fitting locking is provided even when the stanchion 7 is subjected to a load by a force acting outward from the loading area 4. Furthermore, the struts 27 are also raised, so that they pass with their upper region behind the head 10e of the T-shaped metal part 10b and likewise bring about a form-fitting locking against the stanchion 7 automatically opening. At the same time, the struts 27 prevent a lateral play of the stanchion 7 with respect to the fixing member 10.

In the end part of its long lever arm 22b, the main lever 22 has an approximately rectangular punched-out portion 33 which is adjoined by a lowered region 34. When the main lever 22 is pivoted in, a snap-on device (not illustrated) engages over the lowered region 34 and holds the main lever 22 releasably on the lower stanchion part 12. The snap-on device ensures that an unintentional actuation of the lever arrangement 19 does not occur. The snap-on device has a release button which can be displaced upward to release the locking. In this case, the punched-out portion 33 is advantageously arranged in the vicinity of the handle recess 25 in such a manner that an operator's thumb can actuate the release button or the hand reaches through the handle recess 25. Since, in the locked state of the stanchion 7, the lever arrangement 19 is free from force, the snap-on device may be designed to absorb small forces, thus enabling the single-handed operation of the lever arrangement 19.

Figures 12, 13:
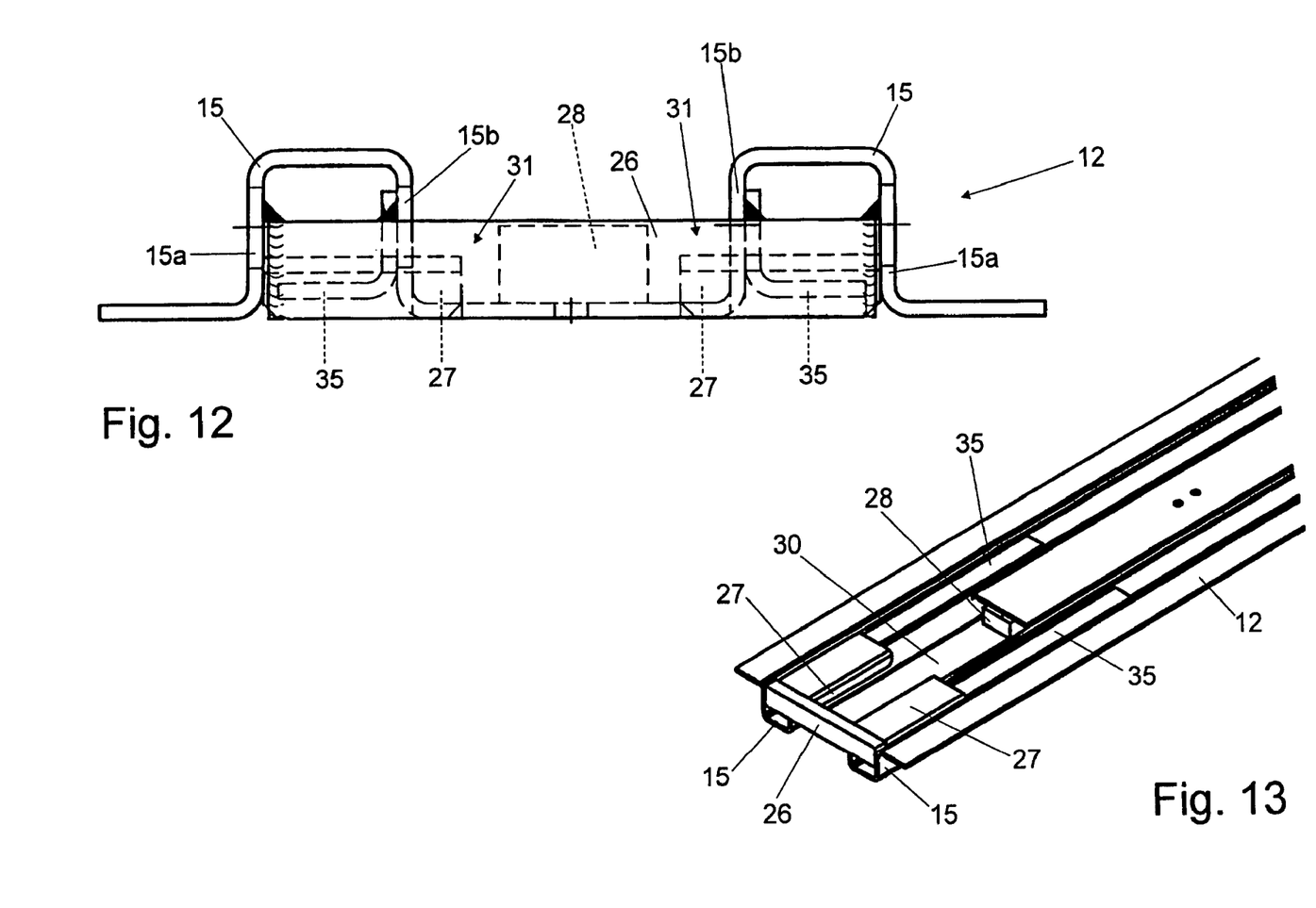
FIG. 12 shows a view from below of the lower region of the stanchion from FIG. 2 in the unlocked state.
FIG. 13 shows a perspective view of the rear side of the lower region of the stanchion from FIG. 2.

It can be seen in FIGS. 12 and 13 that the foot region of the lower stanchion part 12 of the stanchion 7 is additionally reinforced, at least in a region which surrounds the cutout 30, although the projections 15 defining a profile in the form of a double C are already extended uninterrupted as far as the lower end of the lower stanchion part 12 and therefore a favorable transmission of vertical forces is made possible. It can be seen that the transverse web 26 and the struts 27 are formed as a common group, either by welding or as a common cast part, and are welded into the foot region of the stanchion 7. In this case, the transverse web 26 reaches a thickness which amounts to more than half of the depth of the projections 15. Furthermore, the struts 27 are designed such that they pass through the projections 15, so that they are firmly welded to the inside of the respective outer wall 15a of each projection 15. The transverse web 26 is also firmly welded to the walls 15a. This imparts to the foot region of the stanchion 7 an increased stability which at least compensates for the weakening because of the central cutout 30 and, moreover, in particular enables the transmission of forces, acting in the direction of travel, from the stanchion 7 to the fixing member 10.

Angle profiles 35 are furthermore welded into the projections 15 on the inside of their inner walls 15b, said angle profiles reaching into the region of the counterbearing 28 and, as a result, additionally stiffening the projections 15. The end of the free limb of the angle profile 35 is arranged at a short distance from the inside of the outer walls 15a of the projections 15. It is possible to eliminate this distance and to entirely close the rear side of the projections 15. Moreover, the angle profiles 35 may be welded to the struts 27. In particular, a subassembly of transverse web 26, struts 27 and angle profiles 35, if appropriate even with the counterbearing 28, can be manufactured from a single piece and welded into the foot region of the stanchion 7.

The invention functions as follows:

To lock a stanchion 7 on a fixing member 10, said stanchion is first of all moved via the rollers 18 into the correct position and then the recess 30 of the stanchion 7 is pivoted over the fixing member 10. The main lever 22 is then introduced with the claw part 24 into the slot between the two metal parts 10a, 10b, and the main lever 22 is pivoted in the direction of the stanchion 7, as a result of which the intermediate lever 20 and, in particular, the joint 21 with the stanchion 7 is shifted upward. The space provided for receiving the supporting element 29 is correspondingly also enlarged between the positionally fixed fixing member 10 and the counterbearing 28, which is shifted upward with the stanchion 7, so that the supporting element 29 can penetrate this intermediate space. The snap-on device reaches over the lowered region 34.

In order to unlock the stanchion 7, the main lever 22—after release of the snap-on device—and therefore the supporting element 29 which is fastened thereto are pulled away from the lower stanchion part 12 and the flow of force between the fixing member 10, supporting element 29 and counterbearing 28 is therefore interrupted, as a result of which the weight of the stanchion 7 firstly rests on the levers 20, 22 and the joints 21, 23 and, after a further distance, on the rollers 18, with the result that the stanchion can be displaced along the longitudinal support 6.

The invention has been described above with reference to a stanchion having a supporting element 28 which has a flat lower side for bearing on the planar upper side of the fixing member 10, and in which a claw part 24 penetrates a slot of the fixing member 10. The supporting element may also have a step which is complementary to the contour of the upper side of the fixing member 10, for example if the fixing member 10 has a lug which is comparable to the lug 10d and projects upward, it being possible for the main lever to likewise be favorably attached by means of the stepped structure in the corresponding supporting element, which is designed, for example, as a pressing member.

It is similarly possible to support the means of securing the stanchion against these forces pressing to the outside from the loading area, or to replace the above-described securing means with the transverse web 26 and/or the struts 27 by means of an arrangement, in which a securing wedge which can be inserted separately is held in a V-shaped intercepting pocket and thus blocks a movement of the stanchion outward.

What is claimed is:

1. A stanchion for a tarpaulin structure for locking on a fixing member, the stanchion comprising:
    a stanchion part;
    a lever arrangement configured to raise and lock the stanchion,
    a counterbearing rigidly attached to the stanchion part, and
    a supporting element insertable immediately between the fixing member and the counterbearing,
    such that when the stanchion is locked, vertical forces are transmitted from the stanchion part through the counterbearing and the supporting element into the fixing member;
    wherein the supporting element contacts the fixing member and the counterbearing when the stanchion is locked, wherein a substantially horizontally arranged lower surface of the supporting element rests from above on the fixing member, and wherein the counterbearing rests from above on a substantially horizontally arranged upper surface of the supporting element.

2. The stanchion as recited in claim 1, wherein the supporting element comprises a lower boundary, which is matched in a form-fitting manner to the fixing member, and an upper boundary, which is matched in a form-fitting manner to the counterbearing.

3. The stanchion as recited in claim 1, wherein the supporting element is fixed on a part of the stanchion.

4. The stanchion as recited in claim 1, wherein the supporting element is fixed on the fixing member.

5. The stanchion as recited in claim 1, wherein the supporting element is a separate part to the stanchion and fixing member.

6. The stanchion as recited in claim 1, wherein the supporting element is disposed on the lever arrangement.

7. The stanchion as recited in claim 6, wherein the lever arrangement includes a main lever, on which the supporting element is fixed, and an intermediate lever that connects the main lever and the body of the stanchion.

8. The stanchion as recited in claim 7, wherein the intermediate lever and the main lever are configured to have a U-shaped cross section profile, and wherein the U-shaped cross section profiles of the intermediate lever and of the main lever engage one over the other when the stanchion is locked.

9. The stanchion as recited in claim 8, wherein the supporting element and the counterbearing are covered by a base of at least one of the U-shaped levers in the locked state of the stanchion.

10. The stanchion as recited in claim 7, wherein the main lever has a joint for the intermediate lever and a handle recess is arranged above the joint.

11. The stanchion as recited in claim 6, wherein the lever arrangement includes a claw part which can be brought into engagement with the fixing member.

12. The stanchion as recited in claim 1, wherein the stanchion has a foot region and a transverse web in the foot region, and wherein, in a locked state of the stanchion, the transverse web extends behind a lug of the fixing member.

13. The stanchion as recited in claim 1, wherein the stanchion has a foot region and struts disposed in the foot region that run vertically and are disposed at a distance from each other, the distance corresponding to a width of the fixing member.

14. The stanchion as recited in claim 13, wherein the stanchion has a transverse web in the foot region, the transverse web, in the locked state of the stanchion, extends behind a lug of the fixing member, and wherein the transverse web and the struts are designed as a common part.

15. The stanchion as recited in claim 1, wherein the counterbearing upwardly bounds a cutout of the stanchion.

16. The stanchion as recited in claim 1, wherein the stanchion is composed of an upper stanchion part and a lower stanchion part which grip in each other.

17. The stanchion as recited in claim 16, wherein the lower stanchion part has a profile with projections which run in a longitudinal direction of the stanchion and have a rectangular profile.

18. The stanchion as recited in claim 1, wherein the counterbearing includes a metal body connected fixedly to a body of the stanchion.

19. A stanchion for a tarpaulin structure-comprising:
   a counterbearing;
   a stanchion including a lever arrangement having joints and configured to raise and lock the stanchion, the stanchion including the counterbearing rigidly attached to the stanchion;
   a fixing member, the stanchion being lockable on the fixing member; and
   a supporting element form-fittingly inserted between surfaces of the fixing member and the counterbearing facing each other when the stanchion is locked, the joints of the lever arrangement do not transmit any vertical forces and the weight of the stanchion rests on the fixing member through the supporting element,
   wherein the supporting element rests from above on a substantially flat top surface of the fixing member, and
   wherein the lever arrangement is configured to engage the fixing member below said flat top surface.

20. A stanchion for a tarpaulin structure for locking on a fixing member, the stanchion comprising:
   a stanchion part;
   a lever arrangement configured to raise and lock the stanchion;
   a counterbearing rigidly attached to the stanchion part;
   a supporting element insertable between the fixing member and the counterbearing, such that when the stanchion is locked, vertical forces are transmitted from the stanchion part through the counterbearing and the supporting element into the fixing member; and
   a supporting surface, a longitudinal support, and an extension having rollers, and wherein, when the stanchion is raised, the supporting surface comes into contact with the longitudinal support and the extension protrudes above the supporting surface.

21. A stanchion arrangement for a tarpaulin structure, comprising
   a fixing member;
   a stanchion, for locking with and releasing from said fixing member, the stanchion comprising a counterbearing that is rigidly attached to the stanchion; and
   a supporting element insertable between the fixing member and counterbearing;
   wherein the supporting element and the counterbearing have matching facing surfaces which contact each other when the supporting element is inserted, and
   wherein the supporting element and the fixing member have matching facing surfaces which contact each other when the supporting element is inserted,
   such that vertical forces imparted to the counterbearing are immediately fed into the fixing member.

22. A tarpaulin frame for a loading area built over by a tarpaulin structure, including longitudinal supports which run above edges of the loading area, wherein the longitudinal supports are supported against the loading area by at least one stanchion arrangement, said stanchion arrangement comprising:
   a fixing member;
   a stanchion, for locking with and releasing from said fixing member, the stanchion having a foot region and a counterbearing that is rigidly attached to the stanchion; and
   a supporting element insertable between the fixing member and the counterbearing,
   wherein the fixing member is secured in a region of the loading area and the stanchion is locked in the foot region on the fixing member and is supported against a corresponding longitudinal support by means of an upper supporting surface,
   wherein the supporting element contacts the fixing member and the counterbearing when the stanchion is locked, wherein a substantially horizontal lower surface of the supporting element rests from above on the fixing member, and wherein the counterbearing rests from above on a substantially horizontal upper surface of the supporting element being arranged substantially normal to a vertical when the stanchion is locked.

23. The tarpaulin frame as recited in claim 22, wherein the tarpaulin structure is a sliding tarpaulin.

24. The tarpaulin frame as recited in claim 22, wherein the stanchion arrangement further comprises a lever arrangement comprising a main lever and an auxiliary lever, the auxiliary lever being rotatably connected to the main lever and to the stanchion, the main lever being configured to engage the fixing member to support the stanchion when the supporting element is out of contact with the fixing member.

25. A tarpaulin frame for a loading area built over by a tarpaulin structure, including longitudinal supports which run above edges of the loading area, wherein the longitudinal supports are supported against the loading area by at least one stanchion arrangement, said stanchion arrangement comprising:
   a fixing member fixedly coupled to a region of the loading area;
   a non-foldable stanchion having a foot region which can be locked and released from said fixing member and an upper supporting region for supporting the corresponding longitudinal support;
   a first lever being pivotably connected to the stanchion; and
   a second lever being pivotably connected to the first lever,
   wherein a counterbearing is rigidly connected to the stanchion,
   wherein a supporting element is rigidly connected to the second lever,
   wherein the second lever is configured to engage the fixing member to lift the stanchion up from the fixing member before locking of the foot region such that the supporting element is insertable immediately between the fixing member and the counterbearing.

* * * * *